Patented Sept. 6, 1949

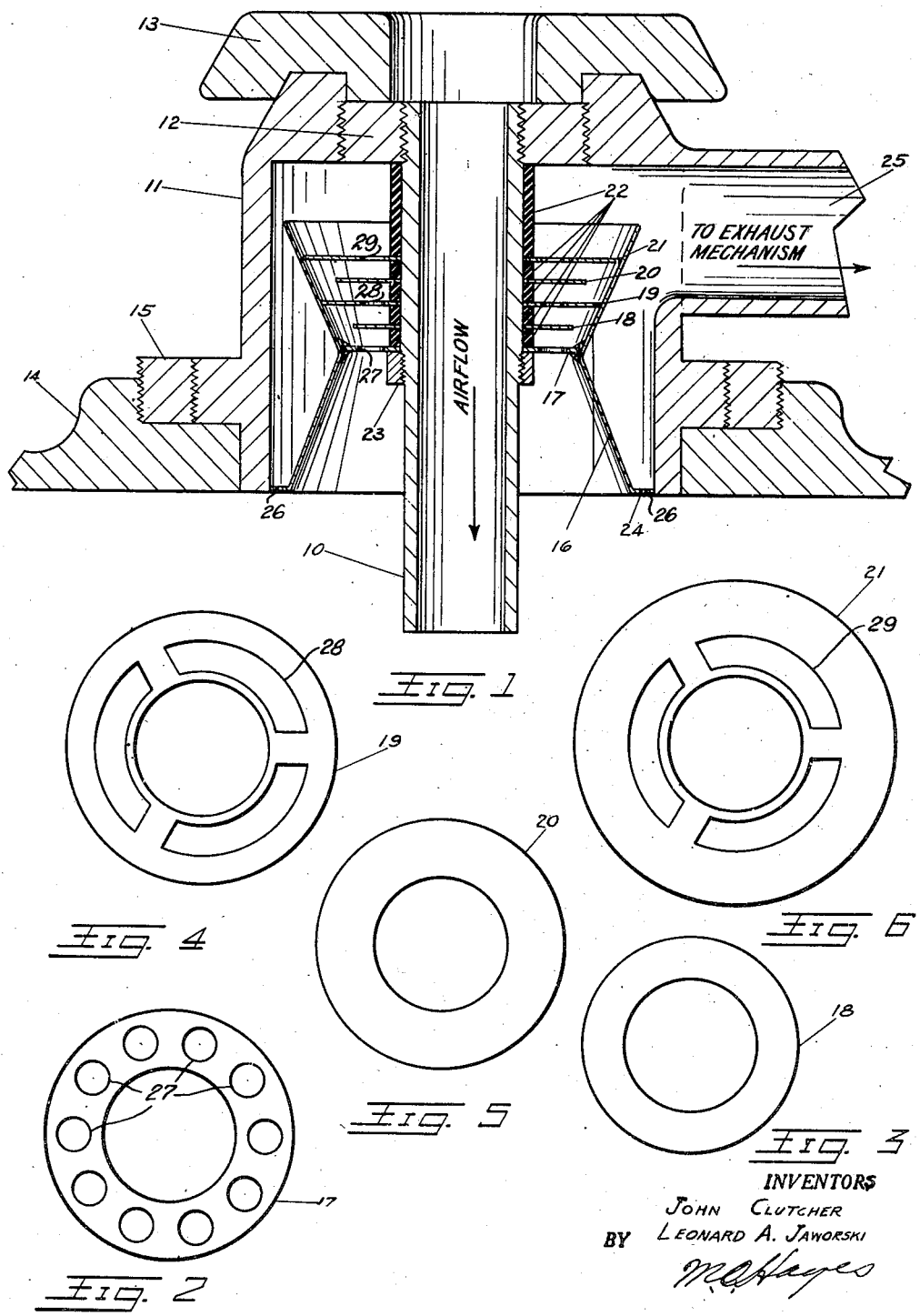

2,480,861

UNITED STATES PATENT OFFICE 2,480,861

BATTERY FILLING AND VENTILATING SYSTEM

Leonard A. Jaworski, Philadelphia, and John Clutcher, Upper Darby, Pa.

Application January 15, 1946, Serial No. 641,374

3 Claims. (Cl. 136—180)

(Granted under the act of March 3, 1883, as amended April 30, 1928; 370 O. G. 757)

This invention relates to a battery filling and ventilation unit.

In the use of batteries on submarines or in any closed compartment, the ventilation of storage cells is a problem. After a period of use and the placing of a charge in said battery, it is found that duct lines, covers and individual cell leads become saturated with acid. During the charge, as the gassing point is reached, the gas forming in the electrolyte forms minute bubbles, the film being electrolyte These bubbles are carried along with the ventilating air into the ducts. This naturally causes rapid corrosion, requires constant cleaning and can lead to dangerous battery system grounds and to the accumulation of gases in the battery compartment.

An object of this invention is to provide a filling tube and ventilating unit designed to reduce the vapors and gases evolving from storage batteries during their gasing period, thereby retaining the liquids in the battery.

Another object is to provide a filling and ventilating barrel having baffles that, in conjunction with air circulation set up by the difference in the outside and inside temperature, cause bombardment and collision of the vapors from the battery liquid, thereby reducing the vapor to its original state and returning the liquid to the battery cell.

Further objects and advantages of this invention, as well as its construction, arrangement and operation will be apparent from the following description and claims in connection with the accompanying drawing, in which Fig. 1 is a sectional elevation of the filling and ventilating structure;

Fig. 2 is a plan view of the centering ring; and Figs. 3, 4, 5, and 6 are plan views of the ventilation baffles.

Filling tube 10 is held in position with reference to the barrel 11 by use of an externally and internally threaded collar 12. Barrel cap 13 is secured in any suitable manner.

The barrel 11 is secured to the top of the battery 14 by any suitable means such as the doubly threaded collar 15. A cylindrical baffle 16, preferably in the shape of two similar frusta of a cone disposed oppositely to define an hourglass configuration, has a flanged portion extending outwardly from the nether end thereof abutting the interior wall of the barrel 11. Said baffle 16 is welded to and positioned by a centering ring 17 (see also Fig. 2). Above the centering ring 17 are placed a series of baffles, in this case four baffles 18, 19, 20, and 21 (see also Figs. 3, 4, 5, and 6). As shown in Figs. 4 and 6, baffles 19 and 21 have arcuate slots concentric the peripheries of said baffles. The centering ring 17 and baffles 18, 19, 20, and 21 are positioned and secured by use of spacers 22 and locknut 23 applied to suitable threading on the filling tube 10. Spaced within the flange 26 of the baffle 16 are a series of drip openings 24.

Protruding from the side of the barrel 11 is an exhaust channel 25 to complete the path of circulation.

A preferred material for parts 10—23 and 25 is hard rubber.

In operation, the battery filling and ventilation unit acts as a mixing bowl. The difference in temperature between the air inside the battery and the outside air sets up a circulation. The colder outside air is drawn down the filling tube 10. The warmer inside air rises through the openings 27 in the centering ring 17. This warmer air carries with it the vapor and the globules formed from the electrolyte. Then the series of baffles causes a turbulence or mixing action resulting in the collision of the vapor globules, reducing them to their original state so that the electrolyte returns to the cell by way of the openings 27, and the gas is drawn off through the exhaust channel 25.

This eliminates the accumulation of water and electrolyte in the ventilation duct lines.

Various modifications and changes can be made in the subject device without departing from the scope of the invention.

The invention described herein may be manufactured and used by or for the Government of the United States of America for governmental purposes without the payment of any royalties thereon or therefor.

We claim.

1. In combination a storage battery and a battery filling and ventilating unit comprising an opening within the top of the battery, a raised cover and a barrel fitted over said opening, a filling tube disposed vertically within and passing through the top of the barrel, a perforated centering ring circumscribing the filling tube, a baffle supported by said ring on said tube interior said barrel, said baffle being shaped similarly to an hour glass and centered about the filling tube at the restricted portion by the centering ring and having a nether flanged portion, a series of circular baffles with staggered openings spaced above the restricted portion of the baffle and surrounding the filling tube, a series of drip openings in said flanged portion of said baffle, and an exhaust channel passing through an upper portion of the side of the barrel.

2. A storage-battery filling and ventilating unit comprising a barrel adapted to be mounted over an opening in the top of a battery, a filling tube secured in and extending through said barrel, a perforated centering ring circumscribing said filling tube within said barrel, a cylinder having a constricted medial portion mounted on the periphery of said centering ring and having a nether perforate flanged portion abutting the interior wall of said barrel, a plurality of annular baffles having staggered openings mounted in spaced relation on said tube interior said cylinder, and an exhaust conduit communicating with the upper portion of the side of said barrel.

3. A storage-battery filling and ventilating unit comprising a barrel adapted to be mounted over an opening in the top of a battery, a filling tube secured in and extending through said barrel, a perforated centering ring circumscribing said filling tube within said barrel, a cylinder having a constricted medial portion mounted on the periphery of said centering ring and having a nether perforate flanged portion abutting the interior wall of said barrel, a plurality of annular baffles mounted in spaced relation on said tube interior said cylinder, selected baffles having a plurality of arcuate slots concentric the peripheries of said baffles, and an exhaust conduit communicating with the upper portion of the side of said barrel.

LEONARD A. JAWORSKI.
JOHN CLUTCHER.

REFERENCES CITED

The following references are of record in the file of this patent:

UNITED STATES PATENTS

| Number | Name | Date |
|---|---|---|
| 1,583,021 | Snyder | May 4, 1926 |
| 1,920,261 | Lavender | Aug. 1, 1933 |